March 27, 1962     J. W. BLACKMAN ET AL     3,026,705

METHOD AND APPARATUS FOR CALIBRATING SCIENTIFIC GLASSWARE

Filed Dec. 27, 1957

INVENTORS
J. W. BLACKMAN &
D. C. SMITH
BY
E. J. HOLLER &
W. A. SCHAICH
ATTORNEYS

United States Patent Office 3,026,705
Patented Mar. 27, 1962

3,026,705
METHOD AND APPARATUS FOR CALIBRATING SCIENTIFIC GLASSWARE
John W. Blackman, Pitman, and Dudley C. Smith, Millville, N.J., assignors to Kimble Glass Company, a corporation of Ohio
Filed Dec. 27, 1957, Ser. No. 705,517
2 Claims. (Cl. 73—1)

The present invention relates to the manufacture of scientific glassware and more specifically to the calibration of graduated glassware such as pipettes, burettes and other essentially tubular articles.

Previously, scientific glassware has been calibrated by filling the article with an accurate charge of calibrating liquid, usually consisting of water or mercury, and then placing a test mark on the surface of the ware at a point opposite the liquid meniscus or upper surface of the test liquid. In the utilization of mercury as a calibrating fluid, the meniscus is convex and the test mark is normally placed opposite the lower or peripheral edge of the meniscus. In the case of water the meniscus is concave and the mark is placed opposite the bottom or lowest point on the curved surface of the meniscus. This has previously been done manually by direct visual observation of the meniscus and its relative position within the article.

After the test marks are applied in the form of a graduated series, the article is coated with wax and lines are ruled in the wax opposite the test marks. Additional lines are frequently placed at regular intervals in the spaces between the test marks to provide uniform subdivisions, for example.

To a great extent the accuracy of the calibration depends upon the skill and care with which the test marks are initially applied to the ware. It is imperative that for the calibration the operator be possessed of exceptional eyesight and manual dexterity and, obviously, a considerable period of training is required before the requisite skill is developed. Even with the operator possessing such skill very close attention to the work is necessary in order to perform the calibrating operation with the extreme accuracy required. The effects of fatigue must be avoided in order that the calibrated glassware can be produced within acceptable commercial tolerances and with a minimum of rejections due to inaccuracy.

Accordingly, it is an object of the present invention to provide an improved method and apparatus for the calibration of scientific glassware and especially of improving the degree of accuracy in the calibration of graduated tubular glass ware.

Another object of the present invention is to provide a method of calibrating an article of scientific glassware with a calibrating liquid wherein an enlarged image of the liquid meniscus of prescribed volumes is projected and aligned for precisely duplicatable marking of the article.

Another object of the present invention is to provide apparatus for introducing or withdrawing prescribed volumes of calibrating liquid into or from the article being calibrated, the apparatus also comprising magnifying and marking means positioned adjacent the liquid meniscus in adjustable relationship therewith for scribing the article in exactly duplicatable arrangement with the elimination of parallax.

The specific nature of this invention, as well as other objects and advantages thereof, will become apparent to those skilled in the art from the following detailed description, taken in conjunction with the annexed sheet of drawings on which, by way of preferred example only, are illustrated the preferred embodiments of this invention.

Figure 1:
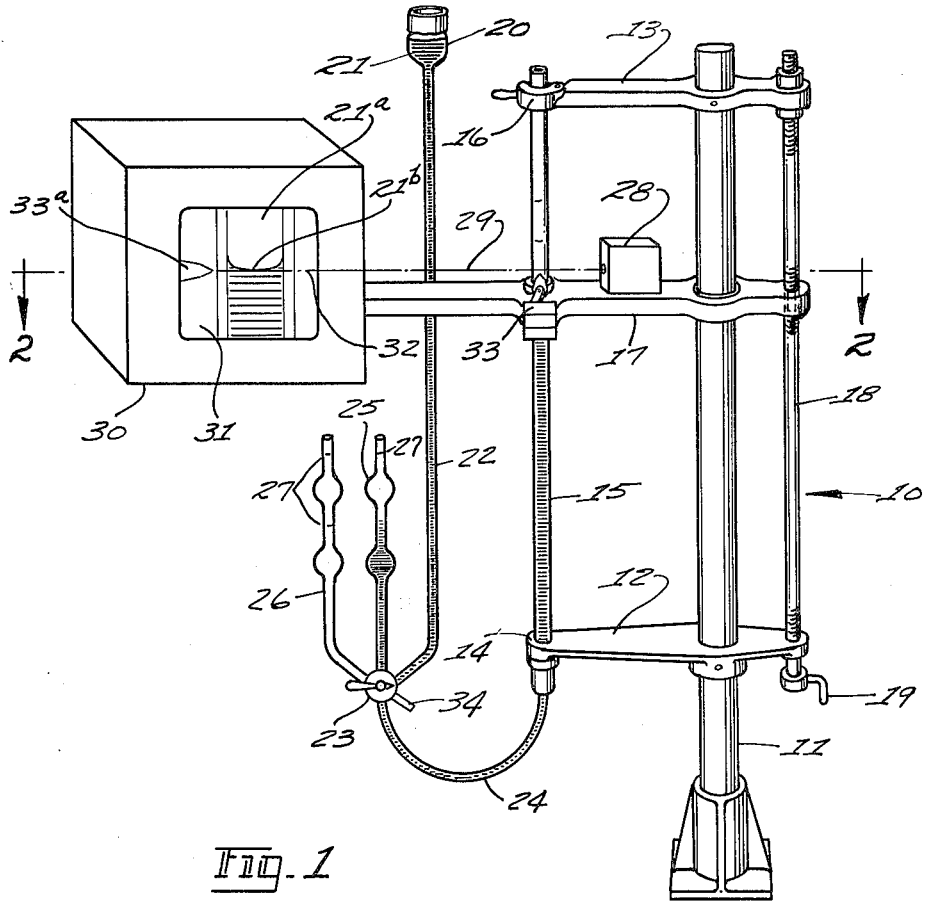
FIG. 1 is a perspective view of one embodiment of the present invention.
Figure 2:
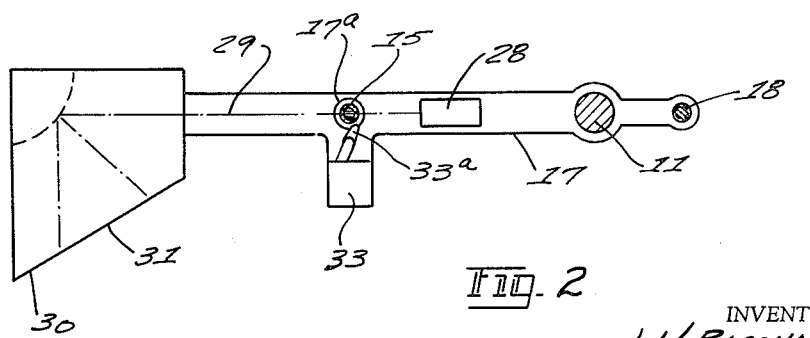
FIG. 2 is a diagrammatic view partly in section taken along the line 2—2 of FIG. 1.

In accordance with the preferred embodiment of the present invention, a magnified image of the liquid meniscus of a prescribed volume of calibrating liquid is projected onto the screen and the article accurately marked with a scribing device utilizing the projected image as a guide. The skill on the part of the operator in creating test marks on glassware is minimized along with ensuring greater precision in the work. The method and apparatus offer the noteworthy advantages of eliminating all effects of parallax during the calibration along with minimizing eyestrain and fatigue so that constant standards of accuracy can be readily maintained. The present invention offers substantial advantages in improving the calibration operation.

The meniscus of the calibrating liquid is magnified in an exactly reproducible manner so that it may be clearly and accurately viewed. Magnification of the meniscus in the ratio of ten to one has been found useful for the prescribed purposes. The magnified image of the meniscus is projected onto a screen and aligned with a reference line thereon. Mechanical apparatus is employed for applying the test mark which permits placing the calibration mark on the article with greater precision. A light source and optical system is employed to magnify the meniscus and the scribing or marking device positioned to contact the article. The requisite skill on the part of the operator in placing the test mark accurately with respect to certain regions of the meniscus is eliminated.

The calibration apparatus designated by the numeral 10 comprises a vertical column or standard 11 on which are attached two horizontal arms or brackets 12 and 13. Brackets 12 and 13 are spaced apart in vertical alignment a lesser distance than the overall lengthwise dimension of the tubular article 15 to be calibrated. Lower bracket 12 has a holder or retention cup 14 on one extremity into which the article 15 may be tightly fitted. Retention cup 14 provides a resilient seat adapted to contact and retain the lower end of the article to prevent leakage of the calibrating fluid therefrom. Upper bracket 13 has a latching device 16 on its extremity in vertical alignment with cup 14 to restrain an upper portion of the article. Intermediate of stationary upper and lower brackets 12 and 13 is disposed a horizontal arm 17 of greater dimensions adaptable to slidable movement on vertical column 11. A central opening 17a is provided in arm 17 through which article 15 freely passes. Thus, arm 17 may be vertically moved without contacting the stationary article except when marking thereof is desired.

A screw assembly extends between upper and lower brackets 12 and 13 for vertical movement of arm 17. A long threaded rod 18 is journaled in the aligned ends of brackets 12 and 13 on the opposite side of column 11. Rod 18 passes through and engages a threaded opening in movable arm 17. Arm 17 is thereby adapted to vertical movement on column 11 by rotation of end crank 19.

A reservoir 20 for retaining a calibrating liquid 21 such as water or mercury is positioned near and above the article 15. A long vertical tube 22 connects with a four-way valve or stopcock 23 below the lower end of article 15. Stopcock 23 has a flexible line 24 connected thereto which leads into the lower extremity of article retention cup 14. Thus, reservoir 20 is adapted to supplying by gravity required volumes of calibrating liquid 21 into the article 15.

Several standard volumetric bulbs 25 and 26 are arranged upright to connect with stopcock 23. Bulbs 25 and 26 are able to retain standard volumes of the calibrating liquid as indicated by several indicia 27.

A light source and optical system 28 is mounted on vertically movable arm 17 for propecting a light beam through the article 15. The optical system may comprise a condensing lens unit. Oppositely disposed from the light source and optical system 28 is an image creating box 30 having an extensive rectangular screen 31 facing the operator. Screen 31 has a horizontal reference line 32 in a central region. The upper portion 21a and the meniscus 21b of the calibrating liquid 21 may be displayed as an inverted image, for example, on screen 31.

A scribing or marking device 33 is carried in a central region of movable arm 17 adjacent the article 15 to be calibrated. The tip 33a of the device 33 is arranged to reside in a common plane with reference line 32.

The marking device 33 may consist of a scribing needle, marking wheel, or other device for applying a test mark to the surface of the article. The marking device 33 may be mechanically operated and arranged so that the test mark is collimated with the reference line on the screen.

In the calibration the following operations are performed:

An opaque stripe is painted on the article 15, preferably in the lengthwise area where the test markings are to be applied. The internal surfaces of the article 15 are cleaned to insure establishment of similar menisci of the liquid during calibration. The article 15 such as a glass tube which will finally comprise the body portion of a pipette or burette is then mounted in a fixed position between the holding cup 14 and the latching device 16.

An approximately measured charge of the calibrating liquid 21 such as mercury is transferred from the reservoir or large standard vessel 20 to the article by gravity through the interconnecting lines 22 and 24. The introduced charge of calibrating liquid 21 will fill the article 15 to its maximum containment for starting the calibration.

Arm 17 carrying the light source and optical system 28 is moved vertically by the gear system or other suitable mechanical means while the article 15 is held fixed. The light source and screen on arm 17 are simultaneously moved to align the top of the liquid meniscus 21b with reference line 32 on the screen. When the two are in alignment the operator then actuates the marking mechanism 33 causing the tip 33a of a needle or stylus to produce a score mark on the printed stripe previously applied to the article. Since the needle or stylus tip 33a is mechanically collimated with the reference line 32 the resulting mark will be accurately aligned with the liquid meniscus boundary at the selected area thereof. Operation of the marking mechanism 33 can be accomplished by depressing a button or lever, for example, or any other method of release to cause the tip 33a to draw a horizontal mark across the surface of the article. No manual dexterity or particular skill is involved in this phase of the operation.

A prescribed specific volume of the calibrating liquid 21 may then be withdrawn into standard bulb 25 by opening stopcock 23 and allowing the liquid to flow by gravity from the article 15 into the bulb 25. Liquid meniscus 21b is then established at a lower level in article 15. Arm 17 is moved downwardly by the gear mechanism until the meniscus 21b corresponds in properly aligned relationship with reference line 32. The marking step utilizing the needle or stylus tip 33a is then repeated.

Standard bulbs 25 and 26 are employed to retain further volumes of the calibrating liquid 21 as additional prescribed amounts are removed stepwise by gravity from the article 15. If necessary, additional standard bulbs may be employed. Following each of the withdrawals, the liquid meniscus is aligned with the reference line for marking the article.

The test mark need not necessarily be applied by the prescribed method, but can similarly be applied by means of a rotating wheel or a paint applicator or by other devices which produce a mark having the desired characteristics.

When the total number of liquid withdrawals has been completed, the article 15 and bulbs 25 and 26 may be emptied by opening stopcock 23 to drain line 34. The liquid may be returned to reservoir 20.

The subject image projection apparatus and method of calibrating graduated glassware is applicable primarily to the manufacture of glassware items having very stringent requirements as regards accuracy, such as those required in various forms of scientific research. Articles calibrated in the aforesaid manner have exhibited much higher degrees of accuracy than heretofore obtainable. The apparatus in various modified forms lends itself to the production of graduated scientific glassware which heretofore have only been capable of manufacturing at substantial cost. By following the teaching of this invention accuracy requirements may be appreciably increased with the articles being produced in quantity at nominal cost.

Obviously, in the described method of practicing the present invention the specific volumes of calibrating liquid may be alternatively introduced into the article to be calibrated in a stepwise manner and the article marked following the prescribed steps of projecting the meniscus image and aligning the image and reference line following each introduction of a certain measured volume. Also, the article may be vertically moved with respect to the image projecting apparatus, the latter being held stationary.

Various other modifications may be resorted to within the spirit and scope of the appended claims.

We claim:

1. Apparatus for the volumetric calibration of a tubular light-transmitting workpiece such as the body portion of a burette, pipette or the like, said apparatus comprising a stationary support bracket consisting of a vertical column and a pair of horizontally-projecting arms adapted to retain upper and lower portions of said workpiece in vertical alignment, a reservoir for retaining a calibrating liquid connected to said workpiece for introducing said liquid thereinto, a plurality of standard volumetric bulbs integrally connected to said workpiece for measuring prescribed specific volumes of said liquid to be temporarily contained within said workpiece, a movable horizontal arm mounted on said vertical column, a light source and image screen having a reference mark fixedly mounted on said movable arm on opposing sides of said workpiece, magnifying means mounted on said movable arm adapted to form an enlarged shadow image of the meniscus of a contained specific volume of said liquid within said workpiece with respect to said reference mark on said image screen, a marking device mounted on said movable arm adjacent said workpiece adapted to inscribe its exterior surface, and adjustment means for positioning said movable arm for precise alignment of said meniscus, said reference mark and said marking device for accurate marking of said article.

2. The method of volumetric calibration of a tubular light-transmitting liquid-measuring and dispensing article such as a burette, pipette or the like, comprising the steps of arranging said tubular article with its axis in vertical alignment, introducing a prescribed volume of calibrating liquid into said article, arranging a light source and image screen on opposite sides of said article to project a light beam normal to and passing through said article onto said screen, moving said light source and screen conjunctively with respect to said article, precisely aligning the projected shadow image of the meniscus of said liquid with a reference mark on said screen and with a scribing device adapted to inscribe the exterior of said article, inscribing an exterior surface of said article with said scribing device, and successively withdrawing a plurality of specific incremental volumes of said calibrating liquid and repeating said moving, image forming, precisely aligning and inscribing steps after each withdrawal.

References Cited in the file of this patent

UNITED STATES PATENTS

| | | |
|---|---|---|
| 278,845 | Atwater | June 5, 1883 |
| 1,231,162 | Husby | June 26, 1917 |
| 2,668,356 | Forbes | Feb. 9, 1954 |
| 2,707,390 | Beretish | May 3, 1955 |
| 2,818,726 | Amonette et al. | Jan. 7, 1958 |